United States Patent
Jeong et al.

(10) Patent No.: US 9,662,990 B2
(45) Date of Patent: May 30, 2017

(54) DOOR ASSEMBLY FOR CHARGING PORT OF ELECTRIC VEHICLE

(71) Applicants: Kia Motors Corporation, Seoul (KR); Hyundai Motor Company, Seoul (KR); CAMS Co., Ltd., Gwangju (KR)

(72) Inventors: Yong Won Jeong, Gwangmyeong-Si (KR); Yong Suk Shin, Anyang-si (KR); Young Ik Cho, Hwaseong-si (KR); Hwan Jeong, Gwangju (KR)

(73) Assignees: Kia Motors Corporation, Seoul (KR); Hyundai Motor Company, Seoul (KR); CAMS Co., Ltd., Gwangju (KR)

( * ) Notice: Subject to any disclaimer, the term of this patent is extended or adjusted under 35 U.S.C. 154(b) by 8 days.

(21) Appl. No.: 14/570,863

(22) Filed: Dec. 15, 2014

(65) Prior Publication Data

US 2015/0375630 A1  Dec. 31, 2015

(30) Foreign Application Priority Data

Jun. 25, 2014  (KR) .......................... 10-2014-0078451

(51) Int. Cl.
*B60L 11/18* (2006.01)
*B60K 15/05* (2006.01)
*B60K 1/00* (2006.01)

(52) U.S. Cl.
CPC ............ *B60L 11/1818* (2013.01); *B60K 1/00* (2013.01); *B60K 15/05* (2013.01); *B60K 2015/053* (2013.01); *B60K 2015/0523* (2013.01)

(58) Field of Classification Search
CPC ................ B60L 11/1818; B60K 15/05; B60K 2015/053; B60K 2015/0523; B60K 1/00
USPC ....................................... 296/97.22; 292/251.5
See application file for complete search history.

(56) References Cited

U.S. PATENT DOCUMENTS

| | | | |
|---|---|---|---|
| 8,528,959 B2* | 9/2013 | Baba ....................... | E05F 5/022 296/97.22 |
| 8,720,968 B2* | 5/2014 | Zalan ...................... | E05B 83/34 292/251.5 |
| 2012/0019206 A1* | 1/2012 | Sekido ................. | B60L 11/1803 320/109 |
| 2013/0153257 A1 | 6/2013 | Yamamaru et al. | |

FOREIGN PATENT DOCUMENTS

| | | |
|---|---|---|
| JP | 2012-079628 | 4/2012 |
| JP | 5004246 B2 | 6/2012 |
| JP | 2013-233867 | 11/2013 |
| KR | 10-0521537 | 9/2005 |
| KR | 10-1124954 | 1/2012 |
| KR | 10-2012-0012652 A | 2/2012 |
| KR | 10-1371272 B1 | 3/2014 |
| WO | WO 2010/143040 A1 | 12/2010 |

\* cited by examiner

*Primary Examiner* — Joseph D Pape
*Assistant Examiner* — Dana Ivey
(74) *Attorney, Agent, or Firm* — Morgan Lewis & Bockius LLP (57) ABSTRACT

A door assembly for a charging port for an electric vehicle may include a link assembly mounted to a back of a charging port door to perform a swing operation, in which the door is mounted in a structure capable of being kept at a minimum distance between the door and a vehicle body when the door is open according to the swing operation.

13 Claims, 5 Drawing Sheets

PRIMARY OPEN
(FOUR-JOINT LINK)

FIG. 6A

SECONDARY OPEN
(SLIDING)

DOOR ASSEMBLY FOR CHARGING PORT OF ELECTRIC VEHICLE

CROSS-REFERENCE TO RELATED APPLICATION

The present application claims priority to Korean Patent Application No. 10-2014-0078451 filed Jun. 25, 2014, the entire contents of which is incorporated herein for all purposes by this reference.

BACKGROUND OF THE INVENTION

Field of the Invention

The present disclosure relates to a door assembly for a charging port for an electric vehicle. More particularly, it relates to a door assembly for a charging port for an electric vehicle that is able to prevent an interference phenomenon with a charging gun, by minimizing an amount of protrusion when opening a charging port door by the use of a four-joint link and a slide structure.

Description of Related Art

In general, an electric vehicle is a vehicle that is equipped with a battery and a motor and runs by the electric power, and has a charging port for charging the battery.

Figure 7:
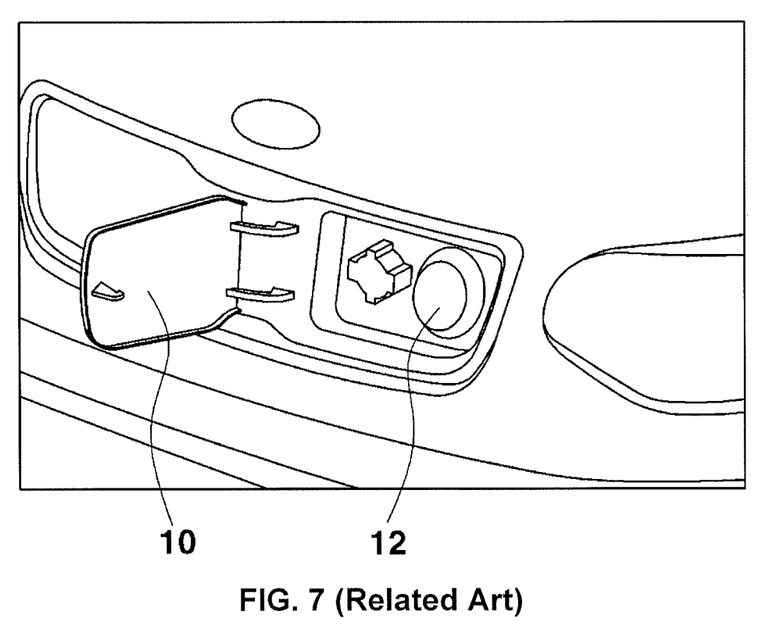
FIG. 7 is a schematic diagram illustrating a structure of a charging port door for a conventional electric vehicle.

Attached FIG. 7 is a schematic view illustrating an open state of a charging port door of a conventional electric vehicle.

As shown in FIG. 7, a door 10 is hinged to an inlet of a charging port 12 for charging the battery by a two-joint link in an openable and closable manner.

Therefore, when pulling the door 10 while rotationally moving it outward, the door 10 is in an open state of being arranged at approximately 90° or more with respect to the inlet of the charging port, and thus, a charging gun is connected to the charging port 12 to charge the battery.

However, at the time of opening the door that opens and closes the charging port, the door is in the state of being arranged at approximately 90° or more with respect to the inlet of the charging port, and the amount of forward protrusion of the door has no choice but to increase. Accordingly, there is inconvenience due to interference phenomenon, such as the charging gun being caught on the door at the time of charging.

Also, since the door is in the state of being simply hinged by the two-joint link, the link might be damaged even with a small force, and thus, there are problems such as damage due to insufficient rigidity of the door and loss of opening and closing functions.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door assembly for a charging port for an electric vehicle that is able to minimize an amount of protrusion at the time of opening the charging port door and thus to prevent the interference phenomenon between the door and the charging gun, by performing the opening operation of the charging port door by the use of the four-joint link and the slide structure such that a primary opening operation due to a swinging operation, a secondary opening operation due to a slide linear movement and the like are performed by a continuous operation or a separate operation.

According to various aspects of the present invention, a door assembly for a charging port for an electric vehicle may include a link assembly mounted to a back of a charging port door to perform a swing operation, wherein the door is mounted in a structure capable of being kept at a minimum distance between the door and a vehicle body when the door is open according to the swing operation.

The link assembly may include a first link, an outer end of which is mounted to one end portion of an inner surface of the charging port door to be swingable through a first hinge pin, and an inner end of which is hinged to the vehicle body, a second link, an outer end of which is mounted to an intermediate portion of the inner surface of the charging port door to be swingable through a second hinge pin, and an inner end of which is hinged to the vehicle body, a third link, an outer end of which is hinged to the second link, and an inner end of which is engaged within a rail mounted on another end portion of the inner surface of the charging port door, and an elastic member that is attached between the first link and the charging port door to exert an elastic restoring force toward an opening direction of the door.

At the outer end of the first link, an angle limitation end adapted to be supported in close contact with a back of the rail plate during opening of the door to limit a door opening angle may be formed to be bent.

At a position apart from the outer end toward the inner end of the second link at a predetermined distance, a third hinge pin, to which the third link is hinged, may be mounted.

The elastic member may be adopted as a coil spring, one end of which is fixed to the first link, and another end of which is inserted and fastened to the first hinge pin, while being fixed to the rail plate.

At the outer end of the second link, an angle limitation end adapted to be supported in close contact with the back of the sliding plate during opening of the door to limit a door opening angle may be formed to be bent.

The rail plate may be integrally formed with a rail guide to protrude therefrom, and the sliding plate is formed with a rail groove into which the rail guide is slidably inserted.

The elastic member may be adopted as a roll spring that can wind around the roll by the elastic restoring force, one end portion of the elastic member being fixed to the rail plate, and another end portion thereof being fixed to the sliding plate.

A separate rail plate may be fixedly mounted to the back of the charging port door, and the link assembly is mounted to the rail plate to perform the swing operation and the sliding operation.

An outer end of the first link of the link assembly may be mounted to one end portion of the rail plate via the first hinge pin so as to perform the swing operation, the outer end of the second link of the link assembly may be mounted to an intermediate portion of the rail plate via the second hinge pin so as to be able to perform the swing operation, the inner end of the third link of the link assembly may be fastened to the other end portion of the rail plate so as to be able to perform the slide operation within the rail of the rail plate, and an elastic member adapted to apply an elastic restoring force toward an opening direction side of the door may be attached between the first link and the rail plate.

The assembly of claim 2, wherein a separate rail plate is fixedly mounted to the back of the charging port door, and the link assembly is mounted to the rail plate to perform the swing operation and the sliding operation.

Through the above-mentioned means to solve the problems, the present invention provides the following advantages:

First, by performing the opening process of the charging port door by the continuous operation or the division operation that includes the primary opening process due to the swing operation and the secondary opening process due to the sliding linear operation, the charging port door is arranged parallel to the vehicle body while keeping the minimum distance therebetween to be able to minimize the amount of protrusion when opening the door and to prevent the interference phenomenon in which the charging gun touches the door during charging accordingly, thereby being able to provide a convenience during charging.

Second, by using the four-joint link including the two-join link or the like such as a pair of links or more, it is possible to ensure a smooth swing operation of the door and to improve the support rigidity of the door.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

First Example

A first example of the present invention places emphasis on the fact that, by performing the opening process of the charging port door by a continuous operation including a primary opening process due to a swing operation and a secondary opening process due to a sliding linear operation, it is possible to minimize an amount of protrusion when opening the door, in a state in which the charging port door is arranged parallel to the vehicle body while keeping a minimum distance therebetween.

Figure 2:
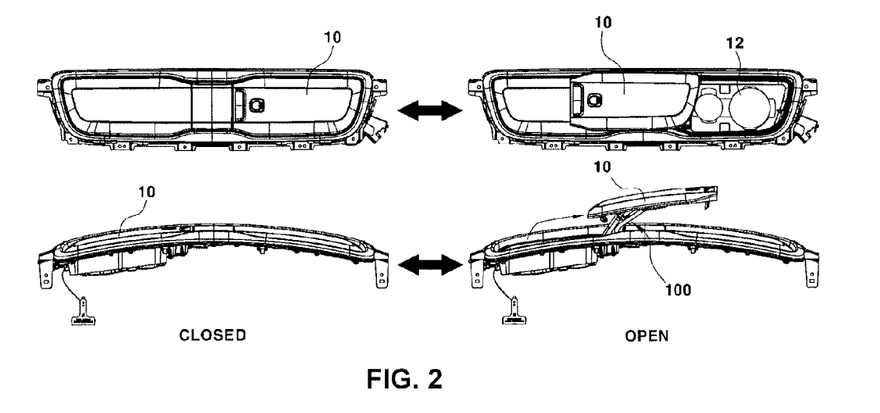
FIG. 2 is a diagram illustrating opening and closing trajectories of a charging port door of an electric vehicle according to the present invention.

Attached FIG. 2 is a diagram illustrating the opening and closing trajectories of a charging port door of an electric vehicle according to various embodiments of the present invention.

In FIG. 2, reference numeral 10 indicates a charging port door, and reference numeral 12 indicates a charging port.

The charging port door 10 is intended to open and close the charging port 12 formed on the outside of the vehicle body, flushes with an vehicle body outer surface during closing, and is arranged parallel to the vehicle body outer surface while keeping a minimum distance therebetween during opening.

According to various embodiments of the present invention, as shown in FIG. 2, the opening operation of the charging port door 10 is performed by a continuous operation that includes a primary opening process due to the swing operation and a secondary opening process due to the sliding linear operation, so that the charging port door 10 is arranged parallel to the vehicle body while keeping the minimum distance therebetween, which makes it possible to minimize the amount of protrusion when opening the door, thereby being able to prevent the interference phenomenon in which the charging gun processed by a user during charging touches the door 10.

Here, an overall configuration in which the charging port door is performed by the continuous operation including the primary opening process due to the swing operation and the secondary opening process due to the sliding linear operation will be described below with reference to FIG. 1A and FIG. 1B.

Figure 1A:
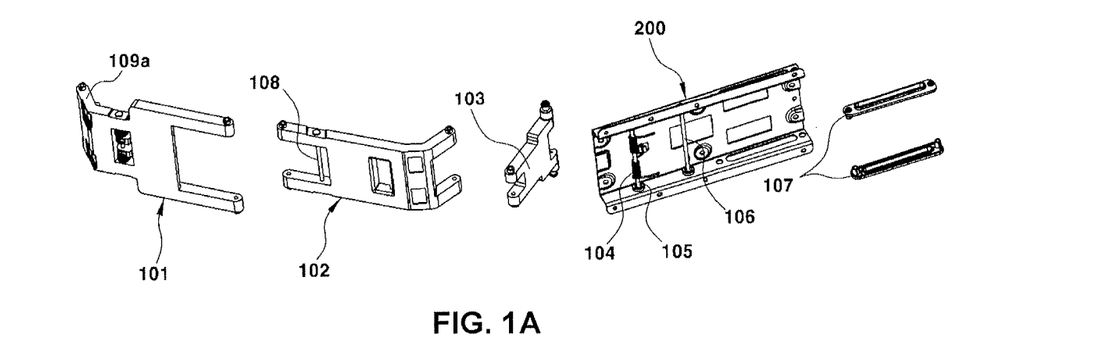
FIG. 1A and FIG. 1B are an exploded perspective view and an assembled perspective view illustrating an exemplary door assembly for a charging port for an electric vehicle according to the present invention.
Figure 1B:
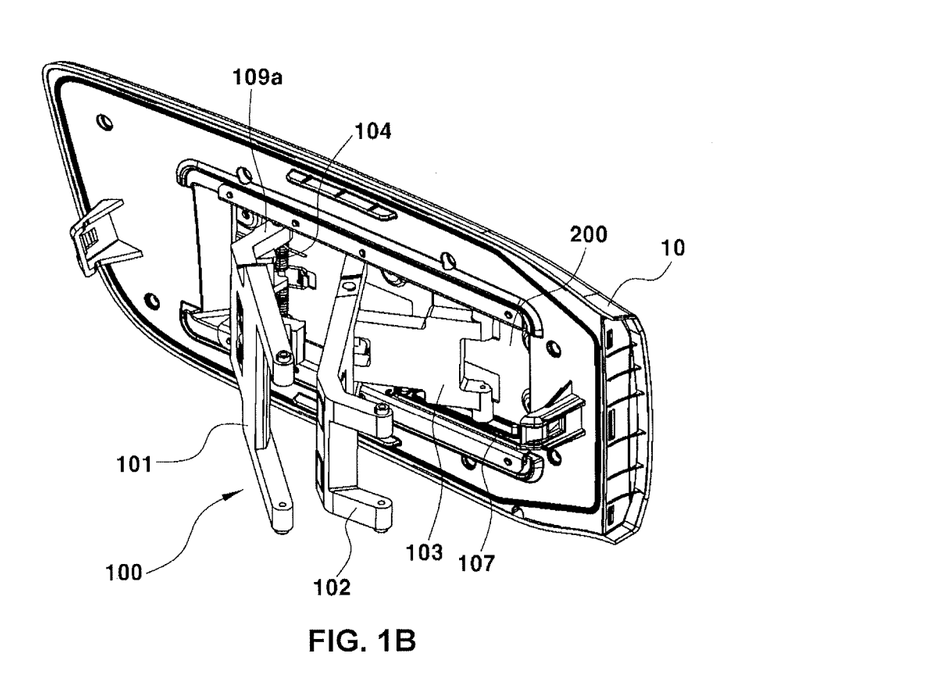

As shown in FIG. 1A and FIG. 1B, a rail plate 200 is fixedly mounted to the back of the charging port door 10.

The rail plate 200 according to various embodiments of the present invention has a rectangular plate structure, a first hinge pin 105 is vertically arranged and mounted at one end portion thereof, and a second hinge pin 106 is vertically arranged and mounted at an intermediate portion thereof.

Furthermore, rails 107 having rail grooves are fixedly mounted on upper and lower surfaces at the other end portion of the rail plate 200.

A link assembly 100 is assembled to the rail plate 200 thus provided for swing and sliding operation of the door 10.

The link assembly 100 according to various embodiments of the present invention is mounted to the rail plate 20 to be able to perform the swing and sliding operation, and serves to keep a minimum distance between the door 10 and the vehicle body when opening the door 10 and to arrange the door 10 parallel to the vehicle body.

The link assembly 100 has a configuration in which three links including a first link 101, a second link 102, and a third link 103 are combined with one another.

First, the outer end of the first link 101 is mounted to the one end portion of the rail plate 200 to be swingable through a first hinge pin 105, and the inner end thereof is hinged to the vehicle body.

At this time, an angle limitation end 109a is formed to be bent at the outer end of the first link 101, and the angle limitation end is supported in close contact with the back of the rail plate 200 when opening the door to limit the door opening angle.

Furthermore, the outer end of the second link 102 is mounted to the intermediate portion of the rail plate 200 to be swingable through a second hinge pin 106, and the inner end thereof is hinged to the vehicle body.

At this time, at a position apart from the outer end of the second link 102 toward the inner end at a constant distance, a third hinge pin 108 is vertically arranged, and is fixedly mounted, and the third link 103 is hinged to the third hinge pin.

Furthermore, the outer end of the third link 103 is hinged to the third hinge pin 108 of the second link 102, and the inner end thereof is slidably fastened into the rail 107 mounted to the other end portion of the rail plate 100.

In particular, an elastic member 104 adapted to exert an elastic restoring force towards the door opening direction is mounted between the first link 101 and the rail plate 200.

More specifically, the elastic member 104 is adopted as a coil spring that is inserted and fastened to the first hinge pin 105, one end of the coil spring is fixed to the first link 101, the other end thereof is fixed to the rail plate 200, thereby exerting the elastic restoring force towards the door opening direction when the door 10 is open.

Figure 3:
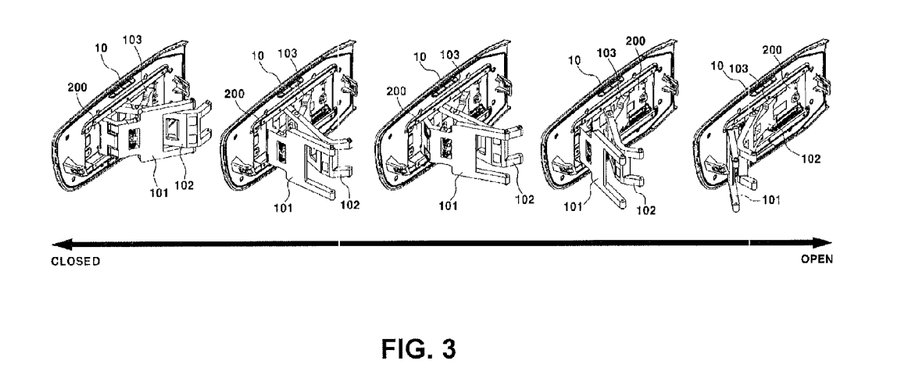
FIG. 3 is a perspective view illustrating the opening and closing processes of a charging port door of an electric vehicle according to present invention.

Here, the opening and closing operation of the charging port door according to various embodiments of the present invention will be described below with to reference to FIG. 3.

First, when a user pulls the door 10 forward, the first link 101 performs the swing operation of angularly rotating about a hinged point toward the door opening direction, by the elastic restoring force of the elastic member 104 connected between the first link 101 and the rail plate 200.

At the same time, the door 10 is swung to one side by the swing operation of the first link 101 and is first open, at the same time, the second link 102 also performs the swing operation of angularly rotating about the hinged point of the vehicle body toward the opening direction, and at this time, the door 10 is in a state of being parallel to the vehicle body.

After the door 10 is first open in this way, the elastic restoring force of the elastic member 104 continuously acts on the first link 101, the first link 101 performs the swing operation at a larger angle, and at the same time, the second link 102 also performs the swing operation.

Subsequently, at the time of the swing operation of the second link 102, the outer end of the third link 103 hinged to the second link 102 angularly rotates and is dragged by the second link 102, and at the same time, the inner end of the third link 103 linearly moves along the rail 107.

That is, since the second opening operation in which the door 10 slides in the linear direction after the primary opening is performed, the inner end of the third link 103 is linearly moved along the rail 107.

Meanwhile, the angle limitation end 109a formed on the outer end of the first link 101 comes into close contact with the back of the rail plate 200 during the full opening of the door, thereby limiting the swing operation of the door 10 and simultaneously supporting the door 10 so as to be parallel to the vehicle body.

Thus, since the opening operation of the door 10 is performed by the continuous operation including the primary opening process due to the swing operation and the secondary opening process due the sliding process, as shown at a right lower end of accompanying FIG. 2, the door 10 is arranged parallel to the vehicle while keeping a minimum distance therebetween.

Therefore, it is possible to minimize the interference phenomenon in which the charging gun touches the door 10 during the handling operation in which the user inserts the charging gun into the charging port 12, thereby providing a convenience at the time of charging.

Second Example

Various embodiments of the present invention place emphasis on the fact that, by performing the opening process of the charging port door by a division operation that includes a primary opening process due to a swing operation and a secondary opening process due to a sliding linear operation, it is possible to minimize the amount of protrusion of the door when opening the door, while the charging port door keeps a minimum distance from the vehicle body and is arranged parallel to the vehicle body.

Figure 5:
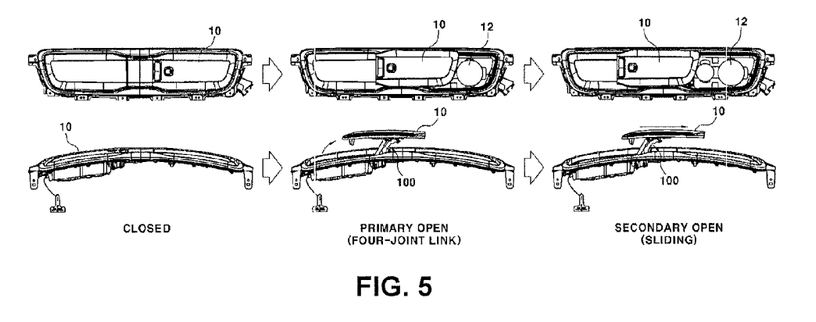
FIG. 5 is a diagram illustrating the opening and closing trajectories of a charging port door of an electric vehicle according to the present invention.

FIG. 5 is a diagram illustrating the opening and closing trajectories of the charging port door of an electric vehicle according to various embodiments of the present invention.

In FIG. 5, reference numeral 10 indicates a charging port door, and reference numeral 12 indicates a charging port.

Similar to previously described embodiments, the charging port door 10 is intended to open and close the charging port 12 formed on the outside of the vehicle body, flushes with an vehicle body outer surface during closing, and is arranged parallel to the vehicle body outer surface while keeping a minimum distance therebetween during opening.

According to various embodiments of the present invention, as shown in FIG. 5, by performing the opening operation of the charging port door 10 by a continuous operation that includes a primary opening process due to the swing operation and a secondary opening process due to the sliding linear operation, the charging port door 10 is arranged parallel to the vehicle body while keeping the minimum distance therebetween, which makes it possible to minimize the amount of protrusion when opening the door, thereby being able to prevent the interference phenomenon in which the charging gun handled by a user during charging touches the door 10.

Here, a specific configuration in which opening of the charging port door is performed by the division operation including the primary opening process due to the swing operation and the secondary opening process due to the sliding linear operation will be described below with reference to FIG. 4A and FIG. 4B.

Figure 4A:
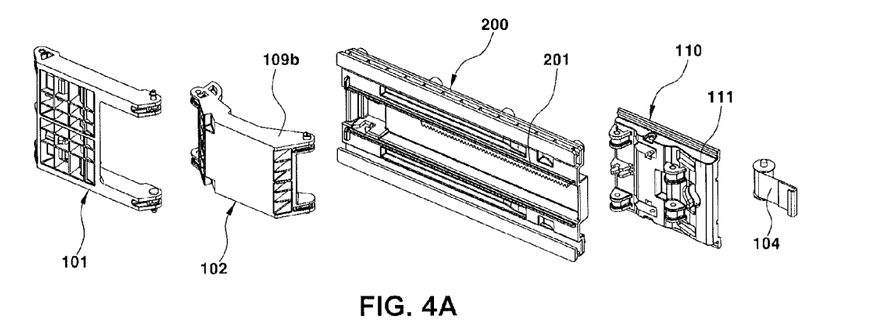
FIG. 4A and FIG. 4B are an exploded perspective view and an assembled perspective view illustrating the opening and closing processes of a charging port door of an electric vehicle according to the present invention.
Figure 4B:
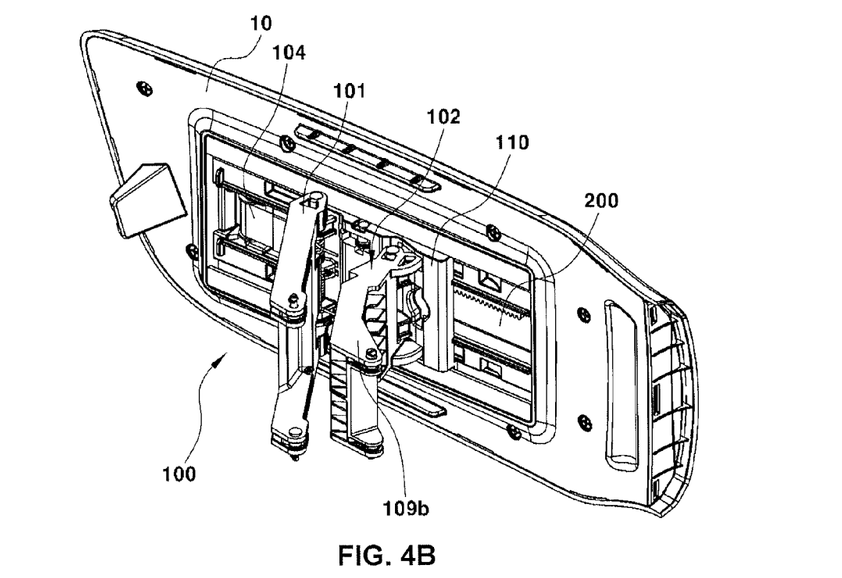

As shown in FIG. 4A and FIG. 4B, a rail plate 200 is fixedly mounted to the back of the charging port door 10.

The rail plate 200 according to various embodiments of the present invention has a rectangular plate structure, and a pair or more of rail guides 201 is formed on the front surface to integrally protrude along a lateral direction.

A link assembly 100 is assembled to the rail plate 200 thus provided for swing and sliding operation of the door 10.

The link assembly 100 according to previously described embodiments of the present invention has a configuration in which a first link 101, a second ring 102, and one sliding plate 110 are combined with one another.

The sliding plate 110 is fastened to the back plate of the rail 200 so as to be slidable along the lateral direction.

In this case, a rail groove 111 is formed on the outer surface of the sliding plate 110, the rail guide 201 of the rail plate 200 is slidably inserted to the rail groove, and a hinge fastening end or the like for hinging the first link 101 and the second link 102 is formed to project from the inner surface of the sliding plate.

Furthermore, the outer end of the first link 101 is hinged to the one end portion of the sliding plate 110 in a swingable manner, and the inner end thereof is hinged to the vehicle body.

Furthermore, the outer end of the second link 102 is hinged to the intermediate portion of the sliding plate 110 in a swingable manner, and the inner end thereof is hinged to the vehicle body.

At this time, an angle limitation end 109 is formed to be bent at the outer end of the second link 102, and the angle limitation end 109 is adapted to be supported in close contact with the back of the sliding plate 110 when opening the door to limit the door opening angle.

In particular, the elastic member 104 adapted to exert the elastic restoring force towards the door opening direction is mounted between the rail plate 200 and the sliding plate 110.

More specifically, the elastic member 104 is adopted as a roll spring that can be wound around the roll by the elastic restoring force, one end of the roll spring is fixed to the rail plate 200 so as to be able to wind therearound, and the other end is fixed to the sliding plate 110.

Here, the opening and closing operation of the charging port door according to various embodiments described above will be described with reference to FIG. 6A and FIG. 6B.

Figure 6A:
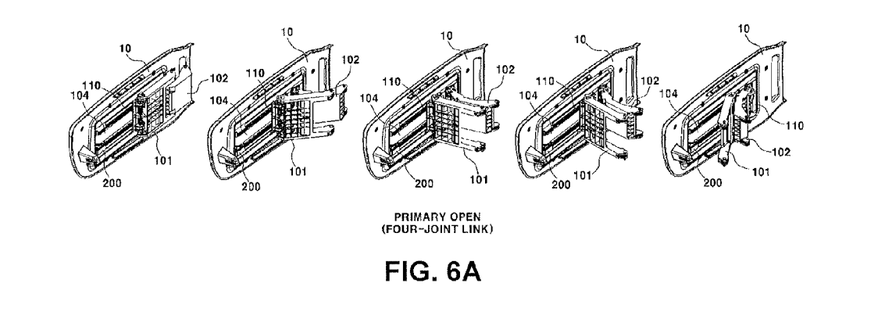
FIG. 6A and FIG. 6B are perspective views illustrating the opening and closing processes of a charging port door of an electric vehicle according to the present invention.
Figure 6B:
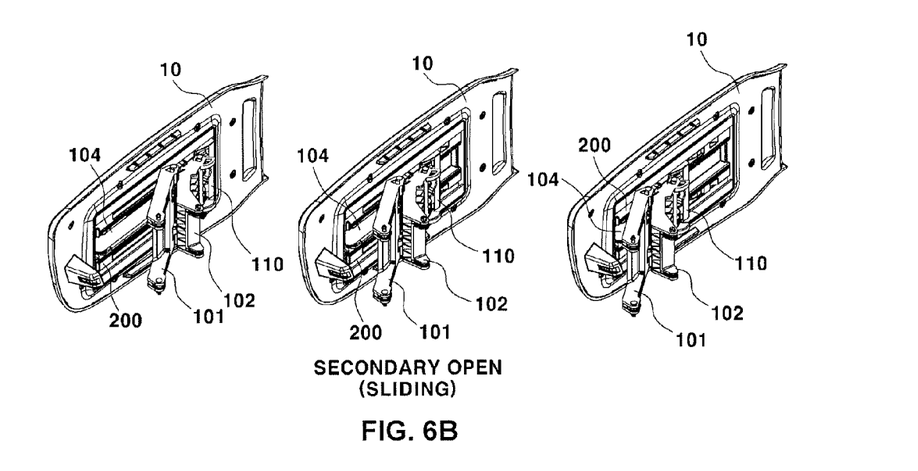

When the door 10 is closed, the elastic member 104 connected between the rail plate 200 and the sliding plate 110, that is, the roll spring is pulled out from the roll and is in the state of being extremely pulled.

In the door-closed state, when the user pulls the door 10 forward and swings it to one side, the first link 101 and the second link 102 perform the swing operation of angularly rotating around hinged point of the vehicle body toward the door opening direction.

At the same time, the door 10 is swung to one side by the swing operation of the first link 101 and the second link 102 and is first opened, and at this time, the door 10 is in a state that is parallel to the vehicle body.

That is, the angle limitation end 109b formed at the outer end of the second link 102 comes into close contact with the back of the sliding plate 110 during the primary opening due to swing of the door, thereby limiting the swing of the door 10 and supporting the door 10 so as to be parallel to the vehicle body.

Subsequently, after the primary opening of the door 10 is performed by the swinging operation of the first link 101 and the second link 102, the elastic restoring force of the roll spring adopted as the elastic member 104 acts.

In other words, the elastic restoring force, by which the roll spring pulled out from the roll tries to be wound around the roll again, acts.

At this time, during the operation in which the roll spring is wound around the roll, the roll spring pulls the sliding plate 110, and the sliding plate 110 performs the sliding movement along the rail plate 200.

In effect, in a state in which the sliding plate 110 is stopped, the rail plate 200 performs the linear movement toward the door opening direction.

Therefore, the door 10 integrated with the rail plate 200 is linearly moved along the opening direction and is secondarily open.

Thus, since the opening operation of the door 10 is performed by the division operation that includes the primary opening process due to the swing operation and the secondary opening process due to the sliding during, as shown at a right lower end of accompanying FIG. 5, the door 10 is arranged parallel to the vehicle body while keeping a minimum distance therebetween, thereby being able to minimize the interference phenomenon in which the charging gun touches the door 10 during the handling operation in which the user inserts the charging gun to the charging port 12, and to provide convenience during charging.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door assembly for a charging port for an electric vehicle including:
  a link assembly mounted to a back of a charging port door, wherein the charging port door is open according to a swing operation of the charging port door,
  wherein a separate rail plate is fixedly mounted to the back of the charging port door, and the link assembly is both pivotally and slidably mounted to the separate rail plate to perform the swing operation of the charging port door with respect to the link assembly and to perform a sliding operation of the charging port door along the separate rail plate, and
  wherein the link assembly includes:
    a first link and a second link which are pivotally mounted to the separate rail plate through hinge pins; and
    a third link, an outer end of which is hinged to the second link, and an inner end of which is engaged within a rail mounted on an end portion of an inner surface of the charging port door.

2. The assembly of claim 1, wherein
the first link includes an outer end of which is mounted to a first end portion of the inner surface of the charging port door to be swingable through a first hinge pin of the hinge ins, and an inner end of which is hinged to a vehicle body; and
the second link includes an outer end of which is mounted to an intermediate portion of the inner surface of the charging port door to be swingable through a second hinge pin of the hinge pins, and an inner end of which is hinged to the vehicle body,
wherein the link assembly further includes an elastic member attached between the first link and the charging port door to exert an elastic restoring force toward an opening direction of the charging port door.

3. The assembly of claim 2, wherein, at the outer end of the first link, an angle limitation end adapted to be supported in close contact with a back of the rail plate during opening of the charging port door to limit a door opening angle is formed to be bent.

4. The assembly of claim 2, wherein, at a position apart from the outer end toward the inner end of the second link at a predetermined distance, a third hinge pin of the hinge pins, to which the third link is hinged, is mounted.

5. The assembly of claim 2, wherein the elastic member is adopted as a coil spring, a first end of which is fixed to the first link, and a second end of which is inserted and fastened to the first hinge pin, while being fixed to the rail plate.

6. The assembly of claim 2, wherein the separate rail plate is fixedly mounted to the back of the charging port door, and the link assembly is mounted to the rail plate to perform the swing operation and the sliding operation.

7. The assembly of claim 1, wherein an outer end of the first link of the link assembly is mounted to a first end portion of the separate rail plate via a first hinge pin of the hinge pins so as to perform the swing operation,
an outer end of the second link of the link assembly is mounted to an intermediate portion of the separate rail plate via a second hinge pin of the hinge pins so as to perform the swing operation,
the inner end of the third link of the link assembly is fastened to a second end portion of the rail plate so as to perform the slide operation within a rail of the separate rail plate, and
an elastic member adapted to apply an elastic restoring force toward an opening direction side of the charging port door is attached between the first link and the rail plate.

8. A door assembly for a charging port for an electric vehicle including:
a link assembly mounted to a back of a charging port door, wherein the charging port door is open according to a swing operation of the charging port door,
wherein a separate rail plate is fixedly mounted to the back of the charging port door, and the link assembly is both pivotally and slidably mounted to the separate rail plate to perform the swing operation of the charging port door with respect to the link assembly and to perform a sliding operation of the charging port door along the separate rail plate, and
wherein the link assembly includes:
a sliding plate slidably fastened to the separate rail plate; and
a first link and a second link which are hinged to the sliding plate to be swingable.

9. The assembly of claim 8, wherein at an outer end of the second link, an angle limitation end adapted to be supported in close contact with a back of the sliding plate during opening of the charging port door to limit a door opening angle is formed to be bent.

10. The assembly of claim 8, wherein the rail plate is integrally formed with a rail guide to protrude therefrom, and the sliding plate is formed with a rail groove into which the rail guide is slidably inserted.

11. The assembly of claim 8, wherein an elastic member is a roll spring, a first end portion of the elastic member being fixed to the rail plate, and a second end portion thereof being fixed to the sliding plate.

12. The assembly of claim 8,
wherein the first link includes an outer end of which is hinged to a first end portion of the sliding plate to be swingable, and an inner end of which is hinged to a vehicle body;
wherein the second link includes an outer end of which is hinged to an intermediate portion of the sliding plate to be swingable, and an inner end of which is hinged to the vehicle body; and
wherein the link assembly further includes an elastic member attached between the separate rail plate and the sliding plate to exert an elastic restoring force toward an opening direction of the charging port door.

13. A door assembly for a charging port for an electric vehicle including a link assembly mounted to a back of a charging port door,
wherein the charging port door is open according to a swing operation of the charging port door,
wherein a separate rail plate is fixedly mounted to the back of the charging port door, and the link assembly is both pivotally and slidably mounted to the separate rail plate to perform the swing operation of the charging port door with respect to the link assembly and to perform a sliding operation of the charging port door along the separate rail plate, and
wherein the link assembly includes:
a first link, an outer end of which is mounted to a first end portion of an inner surface of the charging port door to be swingable through a first hinge pin, and an inner end of which is hinged to a vehicle body;
a second link, an outer end of which is mounted to an intermediate portion of the inner surface of the charging port door to be swingable through a second hinge pin, and an inner end of which is hinged to the vehicle body;
a third link, an outer end of which is hinged to the second link, and an inner end of which is engaged within a rail mounted on a second end portion of the inner surface of the charging port door; and
an elastic member that is attached between the first link and the charging port door to exert an elastic restoring force toward an opening direction of the charging port door.

* * * * *